US007578024B2

(12) United States Patent
Hughes

(10) Patent No.: US 7,578,024 B2
(45) Date of Patent: Aug. 25, 2009

(54) TRASH CONTAINER WITH A VACUUM

(76) Inventor: Daniel Hughes, 1451 Osprey Way, Eagle Mountain, UT (US) 84043

( * ) Notice: Subject to any disclaimer, the term of this patent is extended or adjusted under 35 U.S.C. 154(b) by 171 days.

(21) Appl. No.: 11/595,813

(22) Filed: Nov. 10, 2006

(65) Prior Publication Data

US 2008/0189898 A1 Aug. 14, 2008

Related U.S. Application Data

(60) Provisional application No. 60/735,563, filed on Nov. 10, 2005.

(51) Int. Cl.
*A47L 5/38* (2006.01)
*A47L 15/00* (2006.01)
*B65G 11/04* (2006.01)

(52) U.S. Cl. .......................................... 15/310; 232/44

(58) Field of Classification Search ............. 232/44–63; 220/502; 15/310
See application file for complete search history.

(56) References Cited

U.S. PATENT DOCUMENTS

| | | | | |
|---|---|---|---|---|
| 5,205,013 | A * | 4/1993 | Lopes | 15/301 |
| 5,946,768 | A * | 9/1999 | Kelly | 15/315 |
| 5,953,788 | A * | 9/1999 | Douglas | 15/339 |
| 6,058,560 | A | 5/2000 | Gab et al. | |
| 6,199,714 | B1 * | 3/2001 | Thompson | 220/495.07 |
| 6,286,177 | B1 * | 9/2001 | Robinson | 15/301 |
| 6,671,924 | B1 * | 1/2004 | Rood | 15/310 |
| 7,096,532 | B2 * | 8/2006 | Rood | 15/310 |
| 2004/0093686 | A1 | 5/2004 | Freeman | |
| 2004/0177467 | A1 * | 9/2004 | Jones et al. | 15/310 |

FOREIGN PATENT DOCUMENTS

| | | | |
|---|---|---|---|
| EP | 1 205 141 | A2 | 5/2002 |
| EP | 1205141 | A2 * | 5/2002 |

* cited by examiner

*Primary Examiner*—Bryan R Muller
(74) *Attorney, Agent, or Firm*—Thorpe North & Western LLP

(57) ABSTRACT

A trash container having a base disposed on a support surface. The base has an aperture adjacent the support surface. A receptacle is disposed above the base. The receptacle contains debris received from an opening in an upper end of the receptacle. A vacuum draws debris through the aperture into a channel adjacent to the base and toward the receptacle. A collection chamber is associated with the receptacle and is configured to receive and collect debris from the vacuum and direct debris into the receptacle. The trash container can also include a lid disposed on an upper end of the receptacle. A method of collecting debris for depositing in a trash container includes providing suction to an aperture in a base of the trash container to draw debris from a surface adjacent the container. The method also includes capturing the debris drawn through the aperture in a collection chamber.

13 Claims, 4 Drawing Sheets

TRASH CONTAINER WITH A VACUUM

This application claims the benefit of U.S. provisional application No. 60/735,563 filed Nov. 10, 2005.

FIELD OF THE INVENTION

The present invention relates generally to trash containers.

BACKGROUND OF THE INVENTION

Typical trash containers can receive trash through an opening in the upper end of the container. Consequently, debris that is swept up with a broom must be picked up before it can be disposed in the container. Often a person bends over to pick up the gathered debris using a dust pan or the like. This is an exercise that is difficult for many people. Moreover, bending over can cause permanent and/or temporary back pain and even injury. Additionally, the equipment for picking up the swept up debris is often inadequate for collecting very fine particulate matter such as dust and small units of debris.

Long handled dust pans have been developed to eliminate bending over to collect swept up debris. However, these dust pans still have the problem of inadequately collecting fine particulate matter. Additionally, these devices may compound the fine particle collection problem since the debris being collected is farther away and harder to see.

Vacuum dust pans have been developed to address the problem of collecting fine particulate debris. However, these devices are heavy and awkward to use since they require a negative pressure air pump, an electric motor, and a power source. Additionally, these devices require transferring the collected debris into a waste receptacle.

Vacuums have been combined with trash containers to collect debris that is placed near the bottom of the trash container. However, these devices draw the debris into the bottom of the container. Consequently, when the bottom of the container is filled, it must be emptied before it can be used again.

SUMMARY

The invention provides a trash container having a base that can be disposed on a support surface. The base has an aperture adjacent the support surface. A receptacle is disposed above the base. The receptacle receives and contains debris. A vacuum is operable to draw debris through the aperture into a channel adjacent to the base and toward the receptacle. A collection chamber is configured to receive and collect debris from the channel.

The present invention also provides a method of collecting debris for depositing in a trash container. The method includes providing suction to an aperture in a base of the trash container to draw debris from a surface adjacent the container. The method further includes capturing the debris drawn through the aperture in a collection chamber.

Additional features and advantages of the invention will be apparent from the detailed description which follows, taken in conjunction with the accompanying drawings, which together illustrate, by way of example, features of the invention.

DETAILED DESCRIPTION

Figure 1:
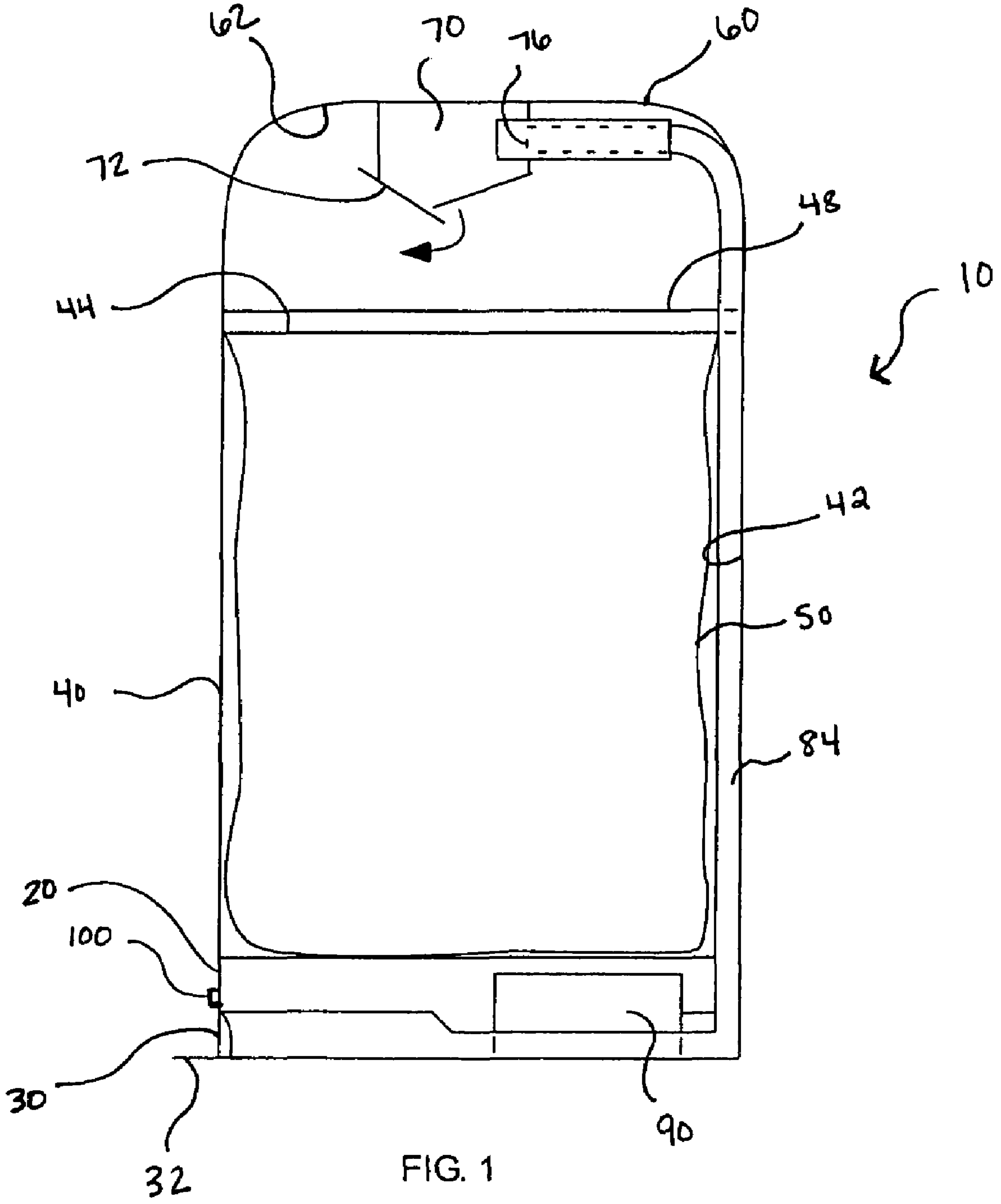
FIG. 1 is a cross-section of the trash container in one embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

FIG. 1 illustrates a cross-sectional view of a trash container 10 in accordance with one embodiment of the present invention. The trash container can include a base 20 that can be disposed on a support surface such as the ground or floor. The base 20 can have an aperture 30 such as an opening or hole through a wall of the base 20. The aperture 30 can be adjacent to the support surface. In one embodiment, a ramp or lip 32 can extend away from the aperture 30 toward the support surface. A receptacle 40 can be disposed above the base 20. The receptacle 40 is configured to receive and contain debris. The receptacle 40 can receive and contain debris from an opening 44 in an upper end 48 of the receptacle. The receptacle can have a removable liner 50, such as a disposable trash bag, or other liner as can be appreciated. Thus, in practice, the receptacle 40 can be a trash can or barrel, with an open upper end, and a trash bag disposed in the can so that trash can be thrown into the bag.

The trash container 10 also includes a vacuum 90 operable to draw debris through the aperture 30 into a channel 84 coupled to the vacuum and toward the receptacle 40. In one embodiment, the channel 84 can be a vacuum hose. The vacuum 90 can provide suction to draw debris through the aperture 30 and into a collection chamber 70. As used herein, "vacuum" refers to a negative pressure air pump which provides suction. The suction can be sufficient to draw debris through the aperture 30 and into the collection chamber 70.

The collection chamber 70 is associated with the receptacle 40 and is configured to receive and collect debris from the channel 84. The collection chamber 70 is operable to direct debris into the receptacle 40. The collection chamber 70 can have a door 72. In one embodiment, the door can be closable due to suction from the vacuum 90 such that when the vacuum is operating the door 72 can be closed to enable debris to be contained within the collection chamber 70. When the vacuum 90 is not operating, the door 72 can be opened to allow debris to fall into the receptacle 40 and/or the removable liner 50. In one embodiment the door 72 can be pivotally coupled to a lower portion of the collection chamber. The door 72 can be balanced such that the door can open toward the collection chamber 70 when the vacuum is not operating. The opening of the door can expose the collection chamber 70 to the interior of the receptacle 40, allowing debris within the collection chamber 70 to empty into the receptacle 40 and/or the removable liner 50.

In another embodiment, the door 72 can be electronically or mechanically actuated. For example, when the vacuum 90 is operating the door can be closed using an electronic or mechanical actuator to allow the chamber 70 to have a substantially closed interior to enable debris to collect within the interior of the chamber. The door can then be opened when the vacuum is turned off using the electronic or mechanical actuator to allow debris within the chamber 70 to empty into the receptacle 40 and/or the removable liner 50. Alternatively, a sensor within the chamber can be used to detect the amount of debris within the chamber. The door can be opened using the electronic or mechanical actuator when the sensor detects that the amount of debris within the chamber is greater than a predetermined amount.

Figure 2:
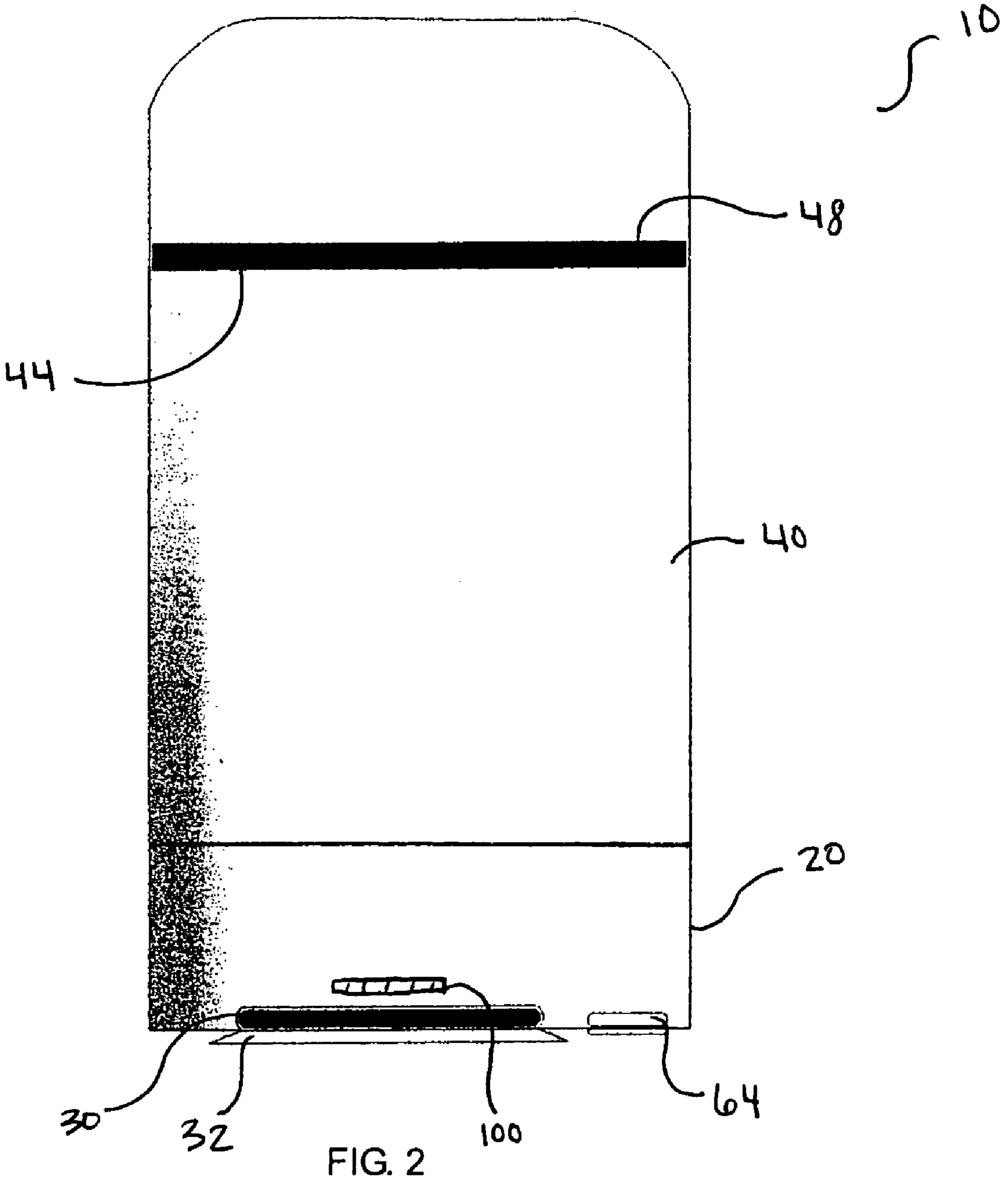
FIG. 2 is a front view of an embodiment of a trash container of the present invention.

In one embodiment, the trash container 10 includes a lid 60 disposable on an upper end 48 of the receptacle 40. The lid 60 can rest freely or seal on the upper end 48 of the receptacle 40. The lid 60 can also be coupled to the receptacle 40 at one or more points of attachment, thus allowing the lid 60 to remain connected to the receptacle 40 even when it is opened. Alternatively, the lid 60 can rest freely on the upper end 48 of the receptacle 40. In either case, the lid 60 can be removed from the upper end 48 of the receptacle to open the receptacle and allow access to the removable liner 50 or interior of the receptacle. In one aspect, a foot pedal 64 (FIG. 2) can be coupled to a mechanical linkage (not shown) to open the lid 60 when the foot pedal 64 is depressed, as can be appreciated.

Figure 3:
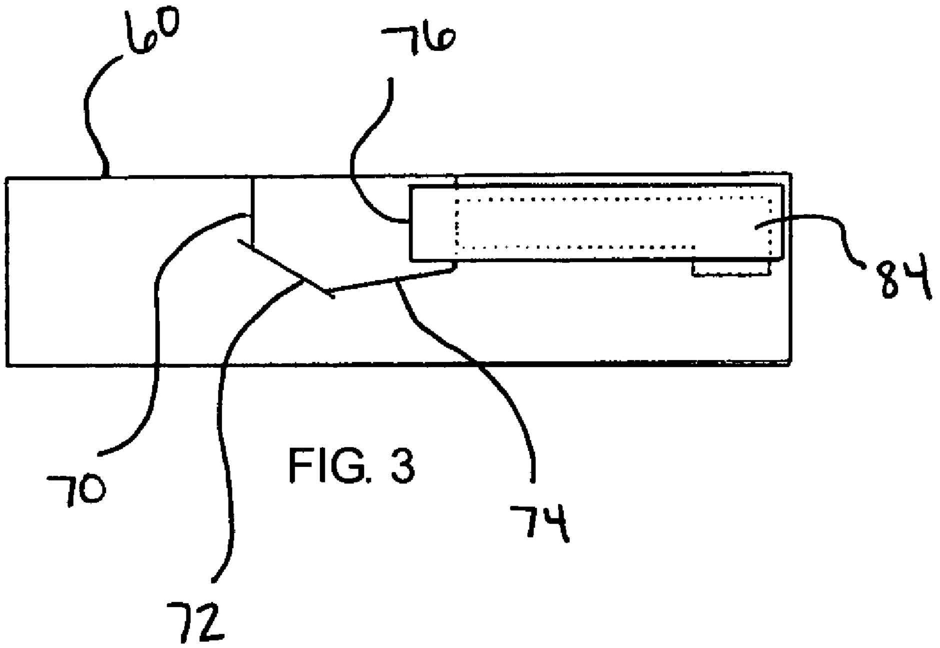
FIG. 3 is a cross-section of a lid on the trash container in accordance with an embodiment of the present invention.
Figure 4:
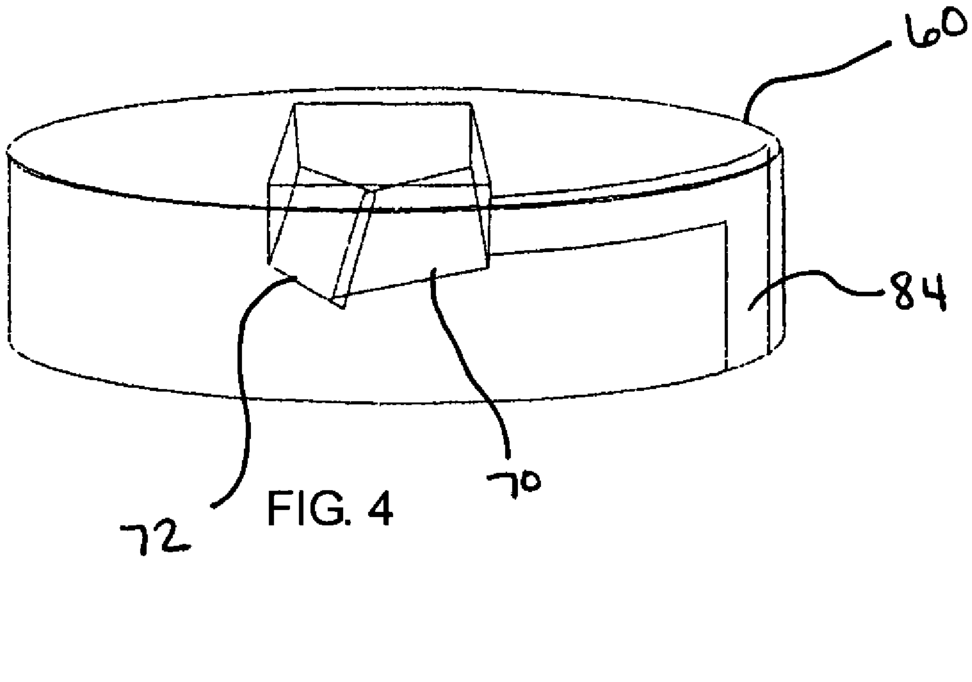
FIG. 4 is a transparent perspective view of the lid of FIG. 3 in accordance with an embodiment of the present invention.
Figure 5:
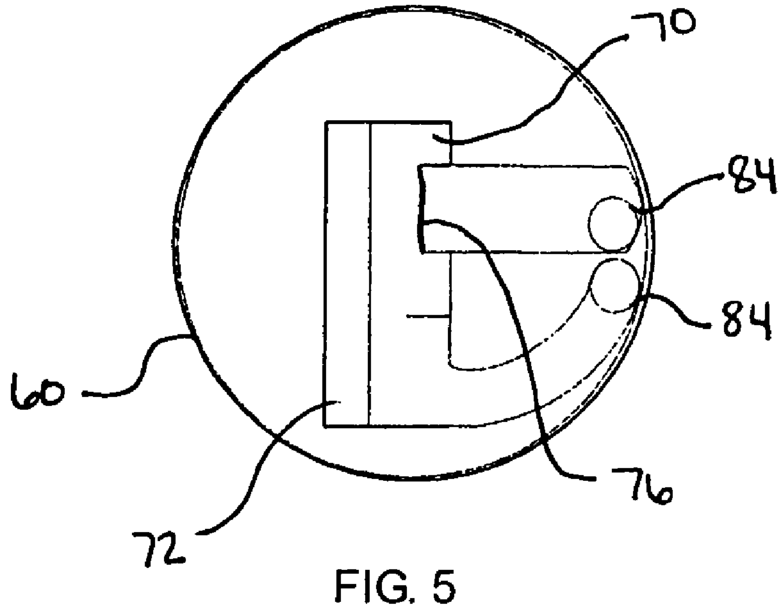
FIG. 5 is a cut-away top view of the lid in accordance with an embodiment of the present invention.

As illustrated in FIGS. 3-5, the lid can be coupled to the collection chamber 70. In one embodiment, the collection chamber 70 is disposed on an under side 62 of the lid 60, though it is possible for the collection chamber to be located on a side of the lid, or some other location that enables debris to empty into the receptacle 40.

Referring to FIGS. 2-5, a channel 84, such as a vacuum hose, can couple to the aperture 30 in the base 20. The channel 84 can extend from the aperture 30 upward along the wall 42 (FIG. 1) of the receptacle 40, into the collection chamber 70 in the lid 60. A vacuum return portion of the air channel can extend from the collection chamber back down along the wall 42 of the receptacle 40 into the base 20 and to the vacuum 90.

Figure 6:
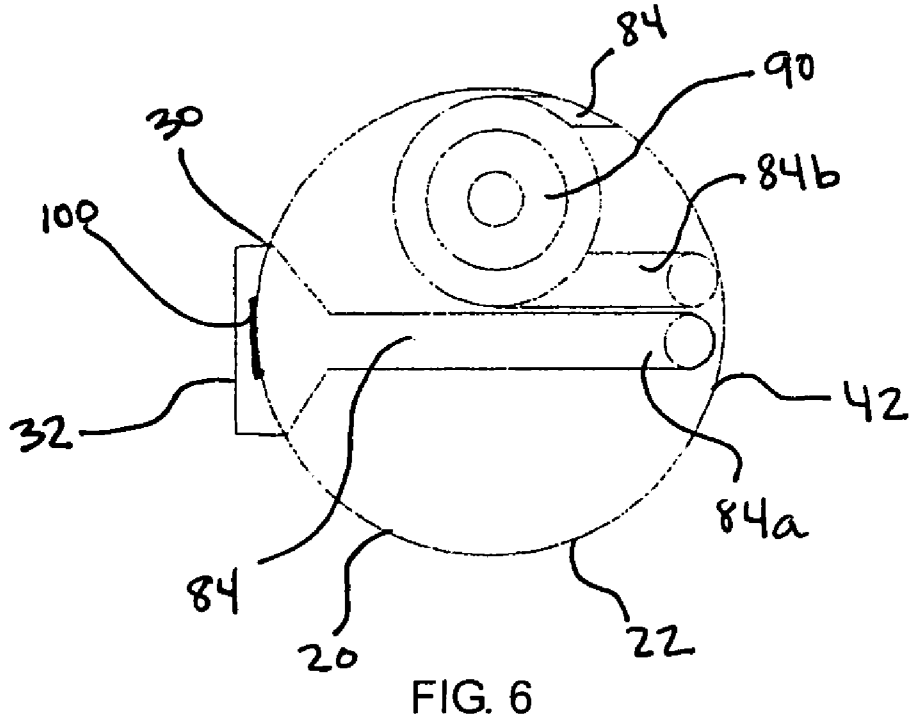
FIG. 6 is a cut-away top view of an embodiment of a base of the trash container in accordance with the present invention.

In one embodiment, as illustrated in FIG. 6, the channel 84 can be two separate segments with the first segment 84*a* extending between the aperture 30 and the collection chamber 70 and the second segment 84*b* extending between the collection chamber 70 and the vacuum 90 disposed adjacent to the base 20. The vacuum hose 84 can be coupled to the vacuum 90.

In use, the vacuum 90 can operate to provide suction through the channel 84. When the vacuum 90 is turned on, the force of the suction from the vacuum can travel through the channel 84 and into the collection chamber 70. The force of the suction can close the door 72 in the collection chamber 70, substantially forming a vacuum seal along the path of suction. The force of the suction can travel down the channel 84 to the aperture 30. The force of the suction can draw debris from the support surface adjacent to the trash container 10 and through the aperture 30 and into the channel 84. The debris can be drawn through the channel 84 and into the collection chamber 70.

As illustrated in FIG. 5, a filter 76 or screen may be placed across an opening of the second segment 84*b* of the channel 84 or vacuum hose leading back to the vacuum 90. The filter 76 will allow air to travel down the vacuum hose, but will substantially prevent debris from being sucked down the vacuum hose and into the vacuum 90. Thus, the debris can be effectively trapped in the collection chamber 70 when the vacuum 90 is operating. When the vacuum is turned off, the door 72 of the collection chamber can open and direct the debris into the receptacle 40, or removable liner 50 through the upper opening 44. In this way, debris can be collected in front of the aperture 30 on the trash container 10 and drawn through the aperture 30 and into the channel 84 via suction provided by the vacuum 90.

Advantageously, the ability of the present embodiment to provide suction to the aperture 30 reduces the need to bend over to collect debris from the support surface. Instead, a user simply needs to sweep, or deposit the debris in front of the aperture 30 and activate the vacuum 90 to draw up the debris. Not only does the present invention reduce the need to bend over to pick up debris, but it also reduces the need to locate a dust pan to pick up the debris. It will also be appreciated that the vacuum 90 can draw up very fine particulate debris, whereas a dust pan almost always leaves a portion of small particulate debris after picking up a pile of debris.

It is a further benefit of the present embodiment that the collection chamber 70 can direct debris to the top of the receptacle 40 (FIG. 1). In prior trash containers containing a vacuum device, the vacuum contains a separate vacuum bag. The vacuum bag must be periodically emptied in order for the vacuum to function. The need for emptying a vacuum bag limits the appeal of such a device. In contrast, in the present invention, the collection chamber 70 collects debris and automatically places the debris within the receptacle 40. This is a particular advantage over other vacuum/trash container combinations because it reduces the need for more frequent emptying of a separate vacuum bag.

In one embodiment of the present invention a sensor 100 (FIG. 1) can be coupled to the base and operable to engage the vacuum when debris is collected on the support surface adjacent the aperture 30. The sensor 100 can be a motion, infrared, ultrasonic or other type of sensor as known in the art. This enables debris to be removed from in front of the aperture 30 of the trash container 10 without the need to manually activate the vacuum 90.

The present invention also provides a method of collecting debris for depositing in a trash container 10. The method includes providing suction to an aperture 30 in a base 20 of the trash container 10 to draw debris from a surface adjacent the container 10. The method further includes capturing the debris drawn through the aperture 30 in a collection chamber 70. The debris can then be released from the collection chamber 70 and into a receptacle 40. The method of the present invention can also include engaging a vacuum 90 to provide negative pressure to the aperture 30 in the base 20 of the trash container 10.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

The invention claimed is:

1. A trash container, comprising:

a base, disposable on a support surface, and having an aperture adjacent the support surface;

a receptacle, disposed above the base, configured to receive and contain debris;

a vacuum, operable to draw debris through the aperture into a channel and toward the receptacle; and a collection chamber associated with the receptacle configured to receive and collect debris from the channel, and wherein the collection chamber further includes a closable door such that when the vacuum is on, the door is closed by suction from the vacuum to substantially contain debris in the collection chamber and when the vacuum is off, the door is opened to allow debris to fall into the receptacle.

2. The trash container of claim 1, wherein the channel is a vacuum hose.

3. The trash container of claim 1, wherein the vacuum provides suction to draw debris through the aperture and into the collection chamber.

4. The trash container of claim 1, further comprising a lid disposable on an upper end of the receptacle.

5. The trash container of claim 4, wherein the lid is coupled to the collection chamber.

6. The trash container of claim 1, wherein the collection chamber is operable to direct debris into the receptacle.

7. The trash container of claim 1, further comprising a sensor, coupled to the base, and operable to activate the vacuum when debris is collected on the support surface adjacent the aperture.

8. A trash container, comprising:

a base, disposable on a support surface, and having an aperture adjacent the support surface;

a receptacle, disposed above the base, configured to receive and contain debris;

a vacuum, coupled to the aperture, and operable to draw debris through the aperture into a channel adjacent to the base and toward the receptacle;

a lid disposable on an upper end of the receptacle; and a collection chamber coupled to the lid and configured to receive and collect debris from the channel, and wherein the collection chamber further includes a closable door such that when the vacuum is on, the door is closed by suction from the vacuum to substantially contain debris in the collection chamber and when the vacuum is off, the door is opened to allow debris to fall into the receptacle.

9. The trash container of claim 8, wherein the channel is a vacuum hose.

10. The trash container of claim 8, wherein the collection chamber is operable to direct debris into the receptacle.

11. The trash container of claim 8, further comprising a sensor, coupled to the base, and operable to activate the vacuum when debris is collected on the support surface adjacent the aperture.

12. The trash container of claim 9, wherein the vacuum hose comprises a first segment and a second segment, the first segment extending from the aperture in the base to the collection chamber, the second segment extending from the collection chamber to the vacuum disposed adjacent the base.

13. The trash container of claim 12, wherein the vacuum hose includes a filter placed across an opening of the second segment of the vacuum hose.

* * * * *